Nov. 5, 1935.   R. H. LEWIS   2,019,823
STORAGE BATTERY BOX
Filed June 9, 1931   2 Sheets-Sheet 1
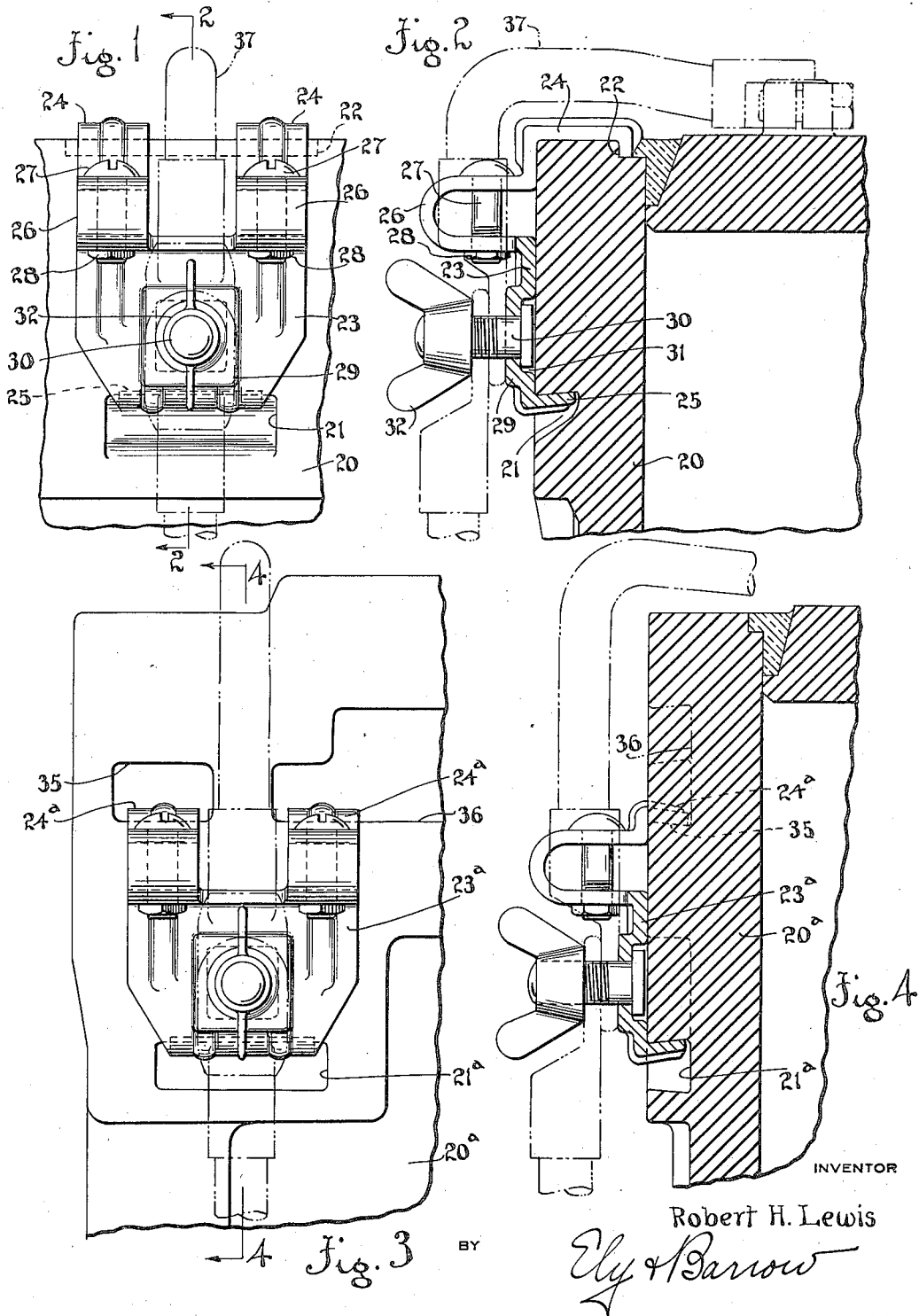
INVENTOR
Robert H. Lewis
BY Ely & Barrow
ATTORNEYS

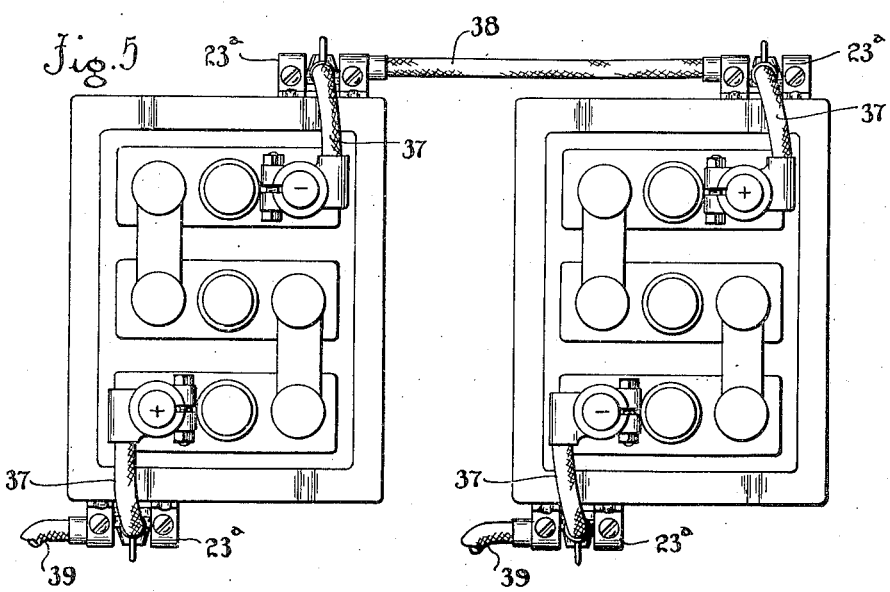

Patented Nov. 5, 1935

2,019,823

UNITED STATES PATENT OFFICE 2,019,823

STORAGE BATTERY BOX

Robert H. Lewis, Akron, Ohio, assignor to Firestone Battery Company, Akron, Ohio, a corporation of Delaware Application June 9, 1931, Serial No. 543,065

2 Claims. (Cl. 136—135)

This invention relates to storage battery boxes, and more especially to storage battery boxes that have terminal connections mounted upon the side of the box to protect the same from corrosion by electrolyte which frequently splashes on the terminals on the top of the battery cells.

The mounting of terminals of the character described is a relatively simple matter with battery boxes made of wood, but presents something of a problem where the boxes are made of hard rubber, asphaltum or other hard, brittle, molded material.

The chief objects of the invention are to provide improved terminal connections for storage battery boxes composed of molded material; to provide for ease and facility in the mounting of the terminal connections on the box; to obtain rigid and secure attachment of the connections to the box; to obviate the necessity of drilling the box; and to obviate the necessity for molding inserts into the wall of the box. Other objects will be manifest.

Of the accompanying drawings:

Figure 1 is a fragmentary elevation of an exterior face of a molded battery box and an improved terminal connection mounted thereon;

Figure 2 is a section on the line 2—2 of Figure 1;

Figure 3 is an elevation of another embodiment of the invention;

Figure 4 is a section on the line 4—4 of Figure 3;

Figure 5 is a plan view of two storage batteries in boxes constructed according to the invention, showing how conductor wires are connected thereto.

Referring to Figures 1 and 2 of the drawings, 20 is a side wall of a molded battery box, 21 is a generally rectangular recess molded in the outer lateral face thereof and having a slightly undercut upper side, and 22 is a short groove or rabbet formed in the top face of the wall 20 at the inner edge thereof.

The terminal connection comprises a metal member or clip 23 that is bifurcated at its top to provide respective leg portions 24, 24, which leg portions are bent at right angles so as to overlie the top face of the wall 20 and formed with end flanges to fit into the groove or rabbet 22. The lower margin of the clip 23 is angularly bent at 25 to engage the undercut side of the recess 21 in the wall 20. The intermediate portions of the respective legs 24 are outwardly bowed at 26, and respective bolts 27 extend through said bowed portions and are provided with nuts 28 on the opposite side thereof as shown, the arrangement being such that setting up of the nuts 28 on the bolts 27 draws the top and bottom of the clip 23 toward each other and causes the leg portions 24 and laterally extending portion 25 to grip the wall 20 so that the clip is securely held thereon. Below the bowed portion 26 the clip 23 is formed with a square boss 29 formed by pressing the metal of the clip outwardly, said boss being apertured to receive a bolt 30 that has a square head, and said head being non-rotatably seated in a square recess 31 formed in the back face of the clip behind said boss. The bolt 30 is provided with a wing nut 32 adapted to clamp cable-terminals to the clip 23.

In the embodiment of the invention shown in Figures 3 and 4 the terminal clip 23ª is mounted upon the end wall of a battery box, and to avoid the handle usually attached thereto, requires to be positioned relatively remote from the upper margin of the box. The clip 23ª is substantially identical with the clip 23 except that leg portions 24ª are shorter and have no end flanges. The leg portions 24ª rest upon the slightly undercut bottom walls of respective recesses 35, 36 formed in the end wall 20ª of the battery box, of which the recess 36 may be utilized in the mounting of a handle on the box. The lower margin of the clip 23ª engages the underside of the recess 21ª in the wall 20ª.

Figure 5 shows how battery boxes equipped with terminal clips 23ª are connected in series with each other. Short connectors or jumpers 37, 37, connect the terminal cells of the batteries to the terminal clips 23ª, and the latter are connected to each other by a wire or bus-bar connection 38. Power leads 39, 39 connect the batteries to the wiring system of the vehicle on which they are used.

The invention provides secure and easily attached terminal connections for the side walls of storage battery boxes, and accomplishes the other objects set forth in the foregoing statement of objects, the advantages of the invention not being wholly sacrificed in the connections that are molded into the wall of the battery box.

Other modifications are possible within the scope of the appended claims which are not limited wholly to the specific construction shown and described.

What is claimed is:

1. The combination of a battery box having a wall thereof formed with opposed shoulder portions, one of said shoulder portions being provided with an undercut recess in the side of said wall, the other of said shoulder portions being formed with a rabbet in the top of said wall, and a terminal connection mounted on the wall of said battery box, said connection including a metal clip having opposed marginal portions adapted to be sprung respectively into clamping engagement with said opposed shoulder portions, said clip having a bowed portion intermediate said marginal portions, and means for clamping said bowed portion for springing said clip into engagement with said shoulder portions.

2. The combination of a battery box formed with recesses in a wall thereof, said recesses being formed with opposed undercut shoulder portions, and a terminal connection mounted on the wall of said battery box, said connection including a metal clip having opposed inwardly bent leg portions inclined toward each other and engaging the undercut walls of the opposed shoulder portions of said recesses, said clip having a bowed portion intermediate said leg portions, and means for clamping said bowed portion for springing said clip to bring said inwardly bent leg portions into clamping engagement with said opposed undercut shoulder portions.

ROBERT H. LEWIS.